US012737258B2

(12) United States Patent
Wheatley et al.

(10) Patent No.: US 12,737,258 B2
(45) Date of Patent: Sep. 15, 2026

(54) TECHNIQUES FOR RECOVERING FROM BOOT FAILURES OVER A COMPUTER NETWORK

(71) Applicant: Absolute Software Corporation, Vancouver (CA)

(72) Inventors: Eric Wheatley, Greenwood Village, CO (US); Jeffrey Bush, Murphy, TX (US); Eugene Khoruzhenko, Vancouver (CA); Pradeep Surgimath, Vancouver (CA); Marcel Laforce, Vancouver (CA); John Herrema, Vancouver (CA); Christy Wyatt, Vancouver (CA); Samir Sherif, Princeton, NJ (US); Nicholas B Van Someren, Vancouver (CA)

(73) Assignee: Absolute Software Corporation, Vancouver (CA)

( * ) Notice: Subject to any disclaimer, the term of this patent is extended or adjusted under 35 U.S.C. 154(b) by 0 days.

(21) Appl. No.: 19/230,954

(22) Filed: Jun. 6, 2025

(65) Prior Publication Data

US 2026/0099408 A1 Apr. 9, 2026

Related U.S. Application Data

(60) Provisional application No. 63/749,967, filed on Jan. 27, 2025, provisional application No. 63/704,753, filed on Oct. 8, 2024.

(51) Int. Cl.
*G06F 11/00* (2006.01)
*G06F 11/14* (2006.01)

(52) U.S. Cl.
CPC .... *G06F 11/1417* (2013.01); *G06F 2201/805* (2013.01)

(58) Field of Classification Search
CPC ....................... G06F 11/1417; G06F 2201/805
See application file for complete search history.

(56) References Cited

U.S. PATENT DOCUMENTS

| | | | | |
|---|---|---|---|---|
| 8,589,667 | B2 | 11/2013 | Mujtaba et al. | |
| 11,269,729 | B1 * | 3/2022 | Bulusu | G06F 11/0778 |
| 11,550,652 | B1 * | 1/2023 | Arora | G06F 11/3442 |

(Continued)

OTHER PUBLICATIONS

Int'l Search Report and Written Opinion conducted in Int'l. Appln. No. PCT/US2025/050150 (Dec. 8, 2025).

(Continued)

*Primary Examiner* — Joshua P Lottich
(74) *Attorney, Agent, or Firm* — GREENBLUM & BERNSTEIN, P.L.C.

(57) ABSTRACT

Embodiments include techniques for booting/rebooting a client device and a client device in a client/server network. At the client device, the techniques include detecting an unsuccessful boot of the client device and then evaluating, to identify a cause of the unsuccessful boot, one or more bootup conditions of the client device. In response to the one or more bootup conditions, embodiments can connect to a server over a computer network to communicate the one or more bootup conditions. Embodiments can also receive, from the server, a desired playbook configured to remediate the cause of the unsuccessful boot and execute the desired playbook to cause a successful boot of the client device.

26 Claims, 7 Drawing Sheets

(56) References Cited

U.S. PATENT DOCUMENTS

| | | | | |
|---|---|---|---|---|
| 2002/0099971 | A1* | 7/2002 | Merkin | G06F 11/1417<br>714/E11.133 |
| 2007/0067613 | A1* | 3/2007 | Mizoguchi | G06F 11/2028<br>714/E11.073 |
| 2014/0281575 | A1 | 9/2014 | Springfield et al. | |
| 2016/0306688 | A1* | 10/2016 | Boyapalle | G06F 11/0793 |
| 2017/0126636 | A1 | 5/2017 | Lor | |
| 2017/0344420 | A1* | 11/2017 | Seibert | G06F 11/079 |
| 2019/0238342 | A1 | 8/2019 | Lian | |
| 2020/0278873 | A1* | 9/2020 | Hsu | G06F 11/0751 |
| 2020/0371859 | A1* | 11/2020 | Sayyed | G06F 8/65 |
| 2021/0286692 | A1 | 9/2021 | Chien | |
| 2022/0277075 | A1* | 9/2022 | Cummings | H04L 67/51 |
| 2023/0023744 | A1* | 1/2023 | Verma | G06F 11/3006 |
| 2023/0025750 | A1* | 1/2023 | Teoh | G06F 11/0727 |
| 2023/0067647 | A1 | 3/2023 | Samuel et al. | |
| 2023/0237155 | A1 | 7/2023 | Jacquin et al. | |
| 2024/0020198 | A1* | 1/2024 | Suryanarayana | G06F 11/1417 |
| 2024/0289202 | A1* | 8/2024 | Gupta | G06F 13/4282 |
| 2024/0362108 | A1* | 10/2024 | Zhang | G06F 11/1438 |
| 2025/0103419 | A1* | 3/2025 | Suryanarayana | G06F 11/079 |
| 2025/0156303 | A1* | 5/2025 | Stevens | G06F 11/3612 |

OTHER PUBLICATIONS

Int'l Search Report and Written Opinion conducted in Int'l. Appln. No. PCT/US2026/012773 (May 19, 2026).

* cited by examiner

TECHNIQUES FOR RECOVERING FROM BOOT FAILURES OVER A COMPUTER NETWORK

CROSS-REFERENCE TO RELATED APPLICATION

This application is a U.S. Nonprovisional Application of U.S. Provisional Application No. 63/704,753 filed Oct. 8, 2024 and of U.S. Provisional Application No. 63/749,967 filed Jan. 27, 2025, the disclosures of which are expressly incorporated by reference herein in their entireties.

BACKGROUND

1. Field of the Invention

Embodiments are directed to a process for modifying a boot process in a client/server network to ensure one or more successful boot operations or procedures.

2. Discussion of Background Information

When computing devices are powered on, they typically go through a series of steps culminating in the loading and execution of an operating system (OS), e.g., Microsoft Windows, a variant of Linux, macOS, etc. The execution step that loads the operating system is commonly referred to as "the bootloader."

The specific boot process and order that a computing device follows is defined in the BIOS of the device, and this boot process is executed automatically unless it has been programmatically overridden, e.g., by a user holding down a certain key during the booting sequence or the boot order has been changed within the context of a running OS or through the BIOS setup menus.

Existing methods of changing the boot order of a machine require that the device is physically in the hands of someone who can press the necessary key sequence during the boot process so as to direct the device to boot from a different source or that the device has a functioning operating system with the necessary applications already installed so that the user can invoke a change in the boot sequence from the running OS or by entering the BIOS setup menus. Other existing methods include installing specialized hardware, such as servers with Integrated Lights Out (ILO) management hardware or high-end PCs with the INTEL Manage Engine chipset installed.

As known, bootloaders generally use local boot options when booting, so managed devices cannot boot recovery software without local access to a device. While some devices can include an option to boot to a PXE or an iPXE image, which is a boot option that boots to an image stored over a network rather than locally, existing bootloaders would require hands-on access to the machine (or the presence of management hardware) in order to boot from PXE.

BRIEF SUMMARY

To address the deficiencies/limitations in the known art, a boot process is described in which remotely controlled/controllable bootloaders (i.e., custom bootloaders) allow for computing devices to be configured for more optimal boot options.

Embodiments are directed to a method of booting/rebooting a client device. The method comprises, at the client device: detecting an unsuccessful boot of the client device; evaluating, to identify a cause of the unsuccessful boot, one or more bootup conditions of the client device; responsive to the one or more bootup conditions, connecting to a server over a computer network to communicate the one or more bootup conditions; receiving, from the server, a desired playbook configured to remediate the cause of the unsuccessful boot; and executing the desired playbook to cause a successful boot of the client device.

In accordance with embodiments, the unsuccessful boot can include unsuccessfully launching an operating system resident on the client device to cause the client device to transition into an operational computing state.

In embodiments, the evaluating comprises identifying, using the server, the cause based on a plurality of different client devices experiencing unsuccessful boots and generating the desired playbook configured to transition the client device from the unsuccessful boot to the successful boot.

According to embodiments, the playbook may include an instruction set configured to remediate the unsuccessful boot. The playbook can be configured for use by a plurality of different client devices.

According to other embodiments, the playbook may include a bootable image configured to remediate the unsuccessful boot.

In other embodiments, when executed, the desired playbook causes the client device to at least one of: reinstall the operating system; restore system to a state from an earlier backup; remove selected files, change registry settings and reboot; download and boot into a separate operating system to repair operating system; add or update files to the OS; change device settings both at the BIOS and OS level; install or remove programs; run third-party applications; install, re-install or update the OS; collect usage data or logs from the device and send to a server; install, update or remove user profiles from the device; enroll the device in certain databases or directories as part of onboarding a new device; perform certain offboarding activities such as unregistering a device and backing up user data before deleting from the device; execute a custom script to perform a custom action; or retrieval of forensic information for secondary analysis or off-line processing.

In still other embodiment, the desired playbook configured to remediate the cause of the unsuccessful boot received from the server is received via Bluetooth.

Embodiments are directed to a client device in a client/server network that includes a processor and one or more storage devices on which an operating system configured to cause the client device to transition into an operational computing state is stored. The one or more storage device further storing a set of computer readable instructions executable by the processor, such that, when executed by the processor, the set of computer readable instructions cause the processor to: detect an unsuccessful boot of the operating system on the client device; connect to a server on the client/server network; obtain a playbook from the server to remediate the unsuccessful boot; and execute the playbook on the client to cause a next boot of the operating system to successfully boot.

In embodiments, the playbook can include a set of remediation instructions that, when executed by the processor, cause the processor to remediate a cause of the unsuccessful boot of the operating system.

According to embodiments, after connecting to the server, the server may be configured to receive and evaluate data from the client device related to the unsuccessful boot and to generate the playbook to be executed on the client device.

According to other embodiments, the data from the client device related to the unsuccessful boot can be evaluated by the server with data from a plurality of different client devices within the client/server network related to unsuccessful boots and to generate the playbook to be executed on the client device. The data from the plurality of different client devices related to the unsuccessful boots may be classified according to causes of the unsuccessful boots and the data from the client device related to the unsuccessful boot is evaluated with data classified with a similar cause of unsuccessful boot. Further, based on the evaluation of the data from client devices related to the unsuccessful boots classified according to causes of unsuccessful boots, the server can generate different playbooks the causes of unsuccessful boots.

In accordance with embodiments, the playbook may include a bootable image, which, when executed by the processor, cause the processor to remediate a cause of the unsuccessful boot of the operating system. The playbook can further include a set of remediation instructions that, when executed by the processor, cause the executed bootable image to remediate the cause of the unsuccessful boot of the operating system.

In still other embodiments, when executed, the playbook causes the processor to at least one of: reinstall the operating system; restore system to a state from an earlier backup; remove selected files, change registry settings and reboot; download and boot into a separate operating system to repair operating system; add or update files to the OS; change device settings both at the BIOS and OS level; install or remove programs; run third-party applications; install, reinstall or update the OS; collect usage data or logs from the device and send to a server; install, update or remove user profiles from the device; enroll the device in certain databases or directories as part of onboarding a new device; perform certain offboarding activities such as unregistering a device and backing up user data before deleting from the device; execute a custom script to perform a custom action; or retrieval of forensic information for secondary analysis or off-line processing.

In accordance with still yet other embodiments, the client connects to the server on the client/server network via Bluetooth.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

Figure 1:
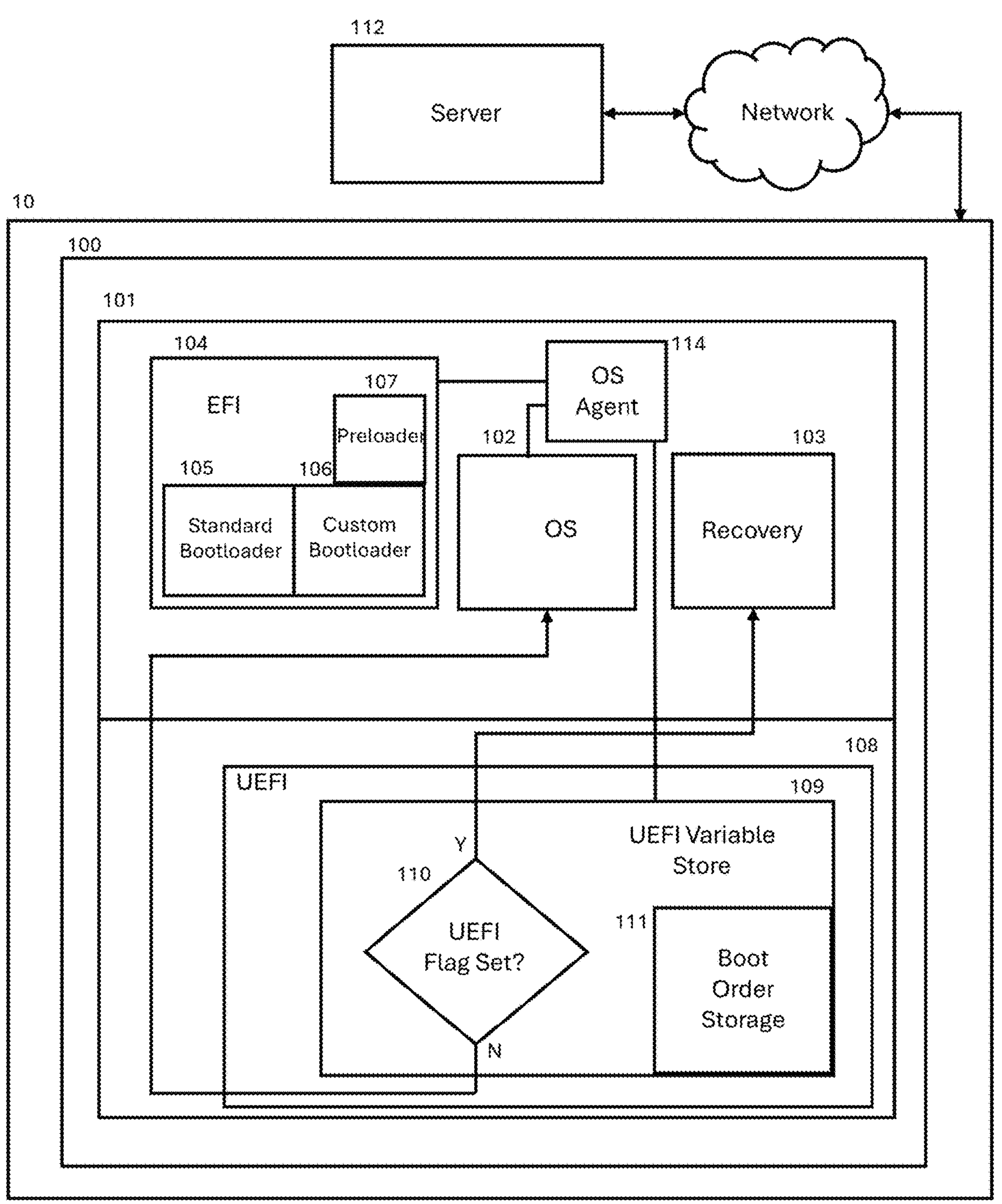
FIG. 1 illustrates an exemplary structure of a portion of the client device according to embodiments.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A custom bootloader described herein can be initially downloaded onto a memory storage device of a client device, preferably on a bootable storage device, such as a solid state drive or a hard disk drive of the device, from a deterministic network endpoint, e.g., one or more servers or one or more cloud servers (collectively referred to herein as "server"), or from a disk or flash drive or other portable storage device. In some scenarios, the custom bootloader, can be stored in a memory storage device of the client device at the factory. To ensure that the client device is in a state where the custom bootloader can be installed, the client device is checked for sufficient storage space in the EFI partition on the bootable storage device, as well as for the presence of a security chip, e.g., a trusted platform module (TPM), with a certain set of commands enabled and for the presence of certain other bits of code on the client device that will allow efficient installation and enablement of the capability. If sufficient space is not available, the EFI partition on the bootable storage device can be resized in a known manner to accommodate the custom bootloader. Moreover, a recovery partition can be created on the bootable storage device.

In embodiments, the boot process allows a computing client device to change the startup or boot sequence in an automated and programmatic way based on conditions detected on the client device or provided by a remote server. In this way, the client device can programmatically determine whether to alter the boot sequence without requiring user intervention or OS-based applications for changing the boot device without requiring dedicated remote management hardware.

Based on detected conditions and read unified extensible firmware interface (UEFI) variables, functionality provided by the custom bootloader can enable determinations to be made to perform remedial actions on those conditions. The computer-implemented procedures configured to resolve a particular condition may be found locally on the client device. Alternatively, the custom bootloader can connect to a server where a playbook for resolution is retrieved and executed locally on the client device. Some functions may include, but are not limited to:

- onboarding/offboarding by enabling firmware-based wipe and location to offboard and track device with remote repair or reinstall to restore device to full operation;
- malware recovery by enabling remote repair or reinstall to restore device with a trusted OS, apps and data, including bare metal scenarios;
- automated device policy compliance enforcement by remedying conditions that cannot be remedied by a running OS (e.g., due to the OS being compromised by ransomware or viruses), by enabling a remote repair, reinstall or policy-enforcement actions to bring device back into compliance with such policies;

OS corruption by enabling remote repair or reinstall to restore device with a trusted OS, apps and data, including bare metal scenarios;

missing/stolen device enabling firmware-based wakeup, locate, freeze, wipe to thwart OS reimaging and provide investigate options;

end of device life by enabling remote repair or reinstall to restore device to base OS image to maximize resale value, including bare metal scenarios; and malicious insider by enabling investigation mode with option for firmware-based freeze upon completion to preserve full device state as evidence.

Of course, this is only an exemplary listing of issues and resolutions that can be addressed by the embodiments described herein should not be construed as being in any way limited only to the issue/resolutions described herein.

The described functions performed by the custom bootloader described by embodiments allows, for instance, a boot sequence to be determined based at least in part by one or more values of unified extensible firmware interface (UEFI) variables set by an application programming interface (API) call executed by one or more applications locally executed on the client device or provided from a remote server, e.g., a cloud-based server. The custom bootloader described by embodiments can be configured to evaluate the one or more UEFI variables, using, e.g., a library of retrievable values for the UEFI variables. The one or more UEFI variable values can be, e.g., a simple binary "set/not set" or the values can be understood to identify and/or drive different playbooks so that, by non-limiting example, evaluating the one or more UEFI variables identifying an "error type A" can drive "playbook 3", while identifying "error type B or C" can drive "playbook 5". After evaluating the one or more UEFI variables' values, the custom bootloader can then be configured to determine whether to execute the default boot sequence or execute a different boot sequence and bootable image already stored on the client device.

In the event the variables cannot be evaluated in the client device or the correct boot order cannot be determined based on variables already passed to the client device, the custom bootloader can be configured to connect to a server and to pass the value of the one or more UEFI variables to the server, which can determine a best solution to take based on the client device's state. Thus, once the variable has been evaluated on the server, the custom bootloader can then receive instructions from the server as to which boot sequence and parameters should be used. Upon receipt of the instructions, functions performed by the custom bootloader can enable the appropriate software and parameters for the next boot, which can also be downloaded from the server as a playbook. In embodiments, the custom bootloader described herein can enable a device to connect to the server at a firmware level and download appropriate software and parameters for the next boot via firmware-level networking.

According to embodiments, the custom bootloader can enable a wired or wireless connection to remote servers without requiring a functioning primary operating system. This includes the ability to automatically connect to networks via a mechanism of storing the networks and credentials as one or more UEFI variables which can then be retrieved by the networking functionality of the client device. In an exemplary implementation of the embodiments, the client device can connect to previously unknown networks if no credentials are required, i.e. an open network.

In further exemplary embodiments, a user can enter access credentials from the client device in a controlled fashion to connect to unknown networks. In this regard, a rule or policy may be provided as to whether the client device can allow the user to connect to unknown networks using credentials. By way of non-limiting example, as a result of the evaluation of the one or more UEFI variables, the custom bootloader can be directed to launch a playbook with a transient OS, i.e., not the primary OS, that includes network drivers, which can be used to connect to the internet/remote servers and pull down/receive playbooks, including a bootable image and may also include instructions. By way of further non-limiting example, the devices can be pre-installed with drivers and libraries that support firmware networking for use in connecting to a network.

In embodiments, the boot sequence can be stopped or even locked by the custom bootloader until communication with the remote server is established. Moreover, messages may be displayed to the end user describing the current state.

In other embodiments, the custom bootloader can evaluate control parameters populated by an API, a remote or locally running process on the server or applications running at the OS layer that have been passed into the boot sequence and stored as one or more UEFI variables. In executing the boot process, the UEFI variable(s) and control parameters can be extracted and evaluated by the bootloader.

The extensible firmware interface (EFI) partition of a client device's bootable storage device, such as a solid-state drive or hard disk, can be used to hold and execute applications, playbooks, variables and other configurations supported by the boot process. Further, according to some embodiments, the custom bootloader can include the functionality to communicate with one or more components to monitor and/or adjust configurations that are not typical or undesirable to ensure that the partition is kept current and is not tampered with by malicious actors. In some embodiments, these components can be stored at the client device, by way of non-limiting example, at an OS agent level, at the EFI level, at the firmware level or combinations thereof, or on the server or the cloud. Moreover, TPM-based identifiers and keys may be used by embodiments so that a client device's EFI partition cannot be tampered with or can be corrected.

In embodiments, the server can uniquely identify and communicate with the device in a cryptographically secure manner. In other embodiments, the server can store predetermined playbooks, which can include a bootable image and, optionally, a series of instructions/parameters for executing the bootable image, to be passed to the device for execution in the boot process. An executable playbook can include or provide instructions to report status updates to appropriate endpoints, e.g., the server, as appropriate. Moreover, the instructions included in a playbook can cause interim and/or final status messages to be sent to the appropriate endpoints, which can include a server, or if the running playbook includes a third-party application, the playbook may be configured to enable connections to a different endpoint to provide a status message.

In some embodiments, the custom bootloader described herein can be installed on the client device to be operated in lieu of a standard bootloader for a primary operating system of the client device. In such scenarios, the server can communicate signals instructing the client device to update unified extensible firmware interface (UEFI) variables and reboot; write one or more unified UEFI variables based on the received signal; and/or evaluate the one or more UEFI variables. When the one or more UEFI variables do not identify a security flag, the custom bootloader may perform a direct boot to the operating system. When the one or more UEFI variables identify a security flag, the custom bootloader can execute one or more processes to determine whether: a desirable boot sequence involves a separate bootable image present on the client device or to connect to the server and receive a desired playbook for execution. In some scenarios, the custom bootloader can execute one of the separate bootable images as the desired playbook to boot a primary OS of the device or to a transient OS, e.g., an operating system that may be invoked during the process of executing a specified playbook.

In accordance with embodiments, a bootloader method may include determining whether a sender and content of the signal is trusted by performing signing and cryptographic tests on the client.

According to other embodiments, and described in further detail herein, if not already present on the device, the client device may connect to the server, e.g., using one or more processes executed at a firmware level and, upon connecting to the server, the client is authenticated to the server. Further, the authenticated client can share data with the server about the current state of the client. The data may include values of the one or more UEFI variables. In some scenarios, the custom bootloader can derive the desired playbook on the server based on the shared values of the one or more UEFI variables. It should be noted that the desired playbook may include a set of instructions configured to restore the client device to an operational state which includes, but is not limited to, executing a desirable boot sequence, or a desired bootable disk image on the client device. In some embodiments, the desired playbook may include a set of instructions that are executed on a remote device that is separate from the client device. In this scenario, the remote device is also configured to communicate instructions for receipt by the client device which, when executed by the client device, causes it to be restored to an operational state. It should be noted that the playbooks described by embodiments of the present invention can be received and/or stored as compressed or uncompressed files for execution by the client device.

In some scenarios, the desired playbook may be transmitted to the client device from the server. The server may also initiate a download of the desired playbook to the client for execution. The desired playbook can instruct the custom bootloader to execute one or more operations including, but not limited to, reinstallation of the operating system; restoration of the client device to a state from an earlier backup; removal of one or more selected files, changing of registry settings and reboot; download and boot into a separate or transient operating system to repair operating system. Of course, this is only an exemplary listing of features that the playbook can perform and the embodiments described herein should not be construed as being in any way limited only to the listed issue/resolutions.

According to further embodiments, an extensible firmware interface (EFI) system partition on the client can be modified so that the custom bootloader can be installed on the client device's bootable storage device. In some scenarios, this storage device can be a solid-state drive or a hard disk drive. In some embodiments, boot device selected UEFI variables may be changed to point to the custom bootloader instead of the standard bootloader.

FIG. 1 shows an exemplary persistence memory storage device 100 on a client device 10, which can include a bootable storage device 101, which can include a solid-state drive or a hard disk drive and non-volatile RAM (NVRAM), onto which the custom bootloader can be installed. Bootable storage device 101 includes the client device's operating system 102, a recovery partition 103 and an extensible firmware interface (EFI) system partition (ESP) 104. Also included on bootable storage device 101 is an OS agent 114 that is coupled to ESP 104, in order to keep the EFI partition functional, and may be coupled to OS 102. The standard bootloader 105 for the client device's primary OS, e.g., Windows, Linux, MacOS, etc., is stored in the ESP 104. It should be noted that "standard bootloader" as used herein generally describes a bootloader provided with the client device at the factory or a bootloader that is configured to use the same settings as a bootloader provided at the factory. In some embodiments, the custom bootloader 106, which may include functionality to supersede commands issued by standard bootloader 105, can also be stored in the ESP 104. In some embodiments, the custom bootloader 106 can include a preloader module 107 or a separate preloader module 107 may be provided as an insertion point with a certificate signed by the manufacturer of the current or primary OS as valid or genuine. The certificate can be stored, e.g., in a signature database, such as a secure boot database. A separate validated preloader module 107 to launch bootloader 106 can be advantageous because, if preloader module 107 is part of bootloader 106, each time changes are made to bootloader 106, a new signed certificate from the OS manufacturer would be required to show bootloader 106 is valid or genuine. Therefore, in some embodiments cases, separate preloader module 107 can be inserted into the boot order to trigger custom bootloader 106. When preloader module 107 has a signed certificate from the OS's manufacturer, even if the client device is equipped with functionality enabled to prevent malicious actors from altering the OS's own boot sequence, the client device will allow the OS agent 114 to update the boot order by inserting preloader module 107 as the first entry in the boot order. Alternatively, if preloader module 107 is not signed by the manufacturer as valid or genuine, preloader module 107 can be installed using a variable called machine owner key (MOK). Thereafter, preloader 107 can be inserted into the permitted boot order in boot order storage 111. Upon launching the signed preloader 107, the signature of custom bootloader 106 is validated and, if secure/valid, custom bootloader 106 is launched.

FIG. 1 also shows the client device's unified extensible firmware interface (UEFI) 108 stored in NVRAM, which includes UEFI runtime code and data including a UEFI variable store 109 with a boot order storage 111, which can be updated to execute (using one or more processors resident on the client device) custom bootloader 106 and a UEFI variable flag 110. In some embodiments, the custom bootloader 106 can be executed by a remote device. OS agent 114 can also be coupled to write, using the one or more processors, in a secure format to UEFI variable store 109 one or more UEFI variables received via a signal from a remote server or from the client device. Based on the received one or more UEFI variables, UEFI variable flag 110 may be set or not. For instance, in some scenarios, one or more applications resident on the client device may detect suspicious or anomalous activities or configurations either with the applications themselves or on the client device and may send instructions or signals that cause a UEFI flag to be set. In some scenarios, the UEFI flag can be set based on telemetry data collected from the client device that is compared against a pre-determined threshold or condition. In other scenarios, the UEFI flag can be set based on user intervention. In such scenarios, the aforementioned conditions result in the client device being in a computing state such that it may not be able to perform boot operations in a way that allows for the client device to be fully functional. As such, and in accordance with the embodiments described herein instructions related to the execution of a different boot sequence may be issued via the custom bootloader 106. In other scenarios, when UEFI variable flag 110 is not set, the client device may continue to execute boot operations in accordance with the standard bootloader. In some embodiments, UEFI variable or flag 110 can be set in response to a signal received in the form of a message in a specific, secure format from a network connection or may have originated from another program or an API call invoked on the client device itself. It should be noted that, in some scenarios, even in the absence of a UEFI variable or flag 110, the boot process can be manually interrupted by a user, e.g., by pressing a predefined key on a keyboard.

Based on flag 110 being set, as part of the programmatic boot sequence, custom bootloader 106 can check locally on the client device for a bootable image. If the client device does not store a bootable image capable of enabling the client device to be restored to a desired operational state, custom bootloader 106 is also configured to enable the client device to connect to a server 112 at a pre-OS level, e.g., at a firmware level, (described in further detail hereinbelow) and share key data elements about its current state, including the values of the one or more UEFI variables or flag 110 which can be used by a remote device (e.g., a server) to prepare a playbook that is configured to enable the client device to operate at the desired operational state.

Figure 2:
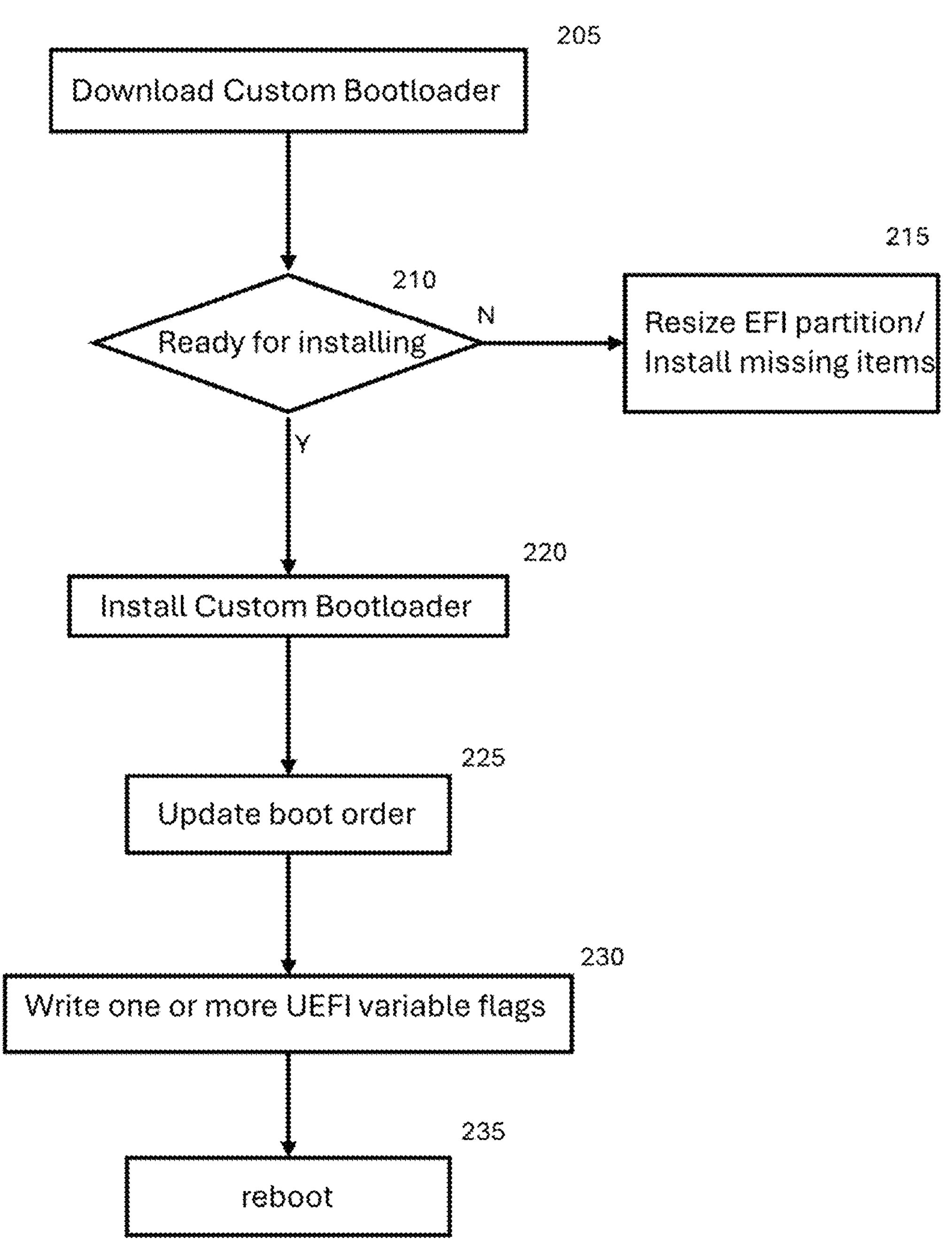
FIG. 2 illustrates an exemplary process for installing a custom bootloader on the client device according to embodiments.

FIG. 2 is an exemplary flow diagram for installing the custom bootloader on to a client device according to embodiments of the invention. The custom bootloader is initially downloaded, e.g., by a user, onto the client device from a remote server, e.g., a cloud server, or from a disk, flash drive or other portable storage device at 205. To ensure that the client device is in a state where the custom bootloader can be installed, the client device can be checked at 210 to validate that the bootloader can be installed. Examples of such validation procedures may include, but are not limited to, sufficient memory storage space in the ESP, SECUREBOOT settings, presence of appropriate UEFI certificates that allow the bootloader to run, presence of an activated OS agent module of a sufficient version number and firmware persistence is enabled, presence of a TPM, and/or presence of supporting drivers and functionality, e.g., Ramdisk.efi. Moreover, in the event the client device includes functionality configured to prevent malicious activity from altering the OS's own boot sequence, e.g., SECUREBOOT, etc., this functionality can be temporarily disabled until after installation.

When the ESP is determined to have sufficient storage space and other pre-requisites are fulfilled, and any functionality for preventing altering of the OS boot sequence is temporarily disabled, the custom bootloader may be installed on the bootable storage device at 220 and the boot order can be updated at 225 to execute the custom bootloader in lieu of the standard bootloader, whereby instructions of the standard bootloader are superseded by instructions from the custom bootloader during a subsequent boot process. As noted above, in some embodiments, the installation can include installing a preloader module that is incorporated into or separate from the custom bootloader. In this scenario, the preloader may be an insertion point preferably with a certificate signed by an appropriate authority, e.g., a manufacturer's certificate, etc., to trigger the bootloader. Moreover, a valid or genuine preloader at the insertion point can enhance deployment efficiency and enable ease of updating the custom bootloader. Otherwise, the preloader module can be installed using the variable called machine owner key (MOK), as discussed above.

In the installation of the custom bootloader, UEFI settings are generated and one or more UEFI variable flags are written at 230. After installation, the device reboots to the custom bootloader at 235. However, final enablement of the recovery feature on the client device may require more than one reboot. Once installed, the preloader 107 is inserted as the first entry in the boot order, which ensures that preloader 107 is always run during each boot cycle. As the custom bootloader runs every time, it is able to retrieve messages in the form of one or more UEFI variables and other signals and can validate that the messages were sent over a secure channel and have not been tampered with or otherwise interfered with by using cryptographic techniques and, based on these retrieved messages, decide whether to pass control to the OS bootloader or to an alternative recovery loader or other bootable device.

Figure 3A:
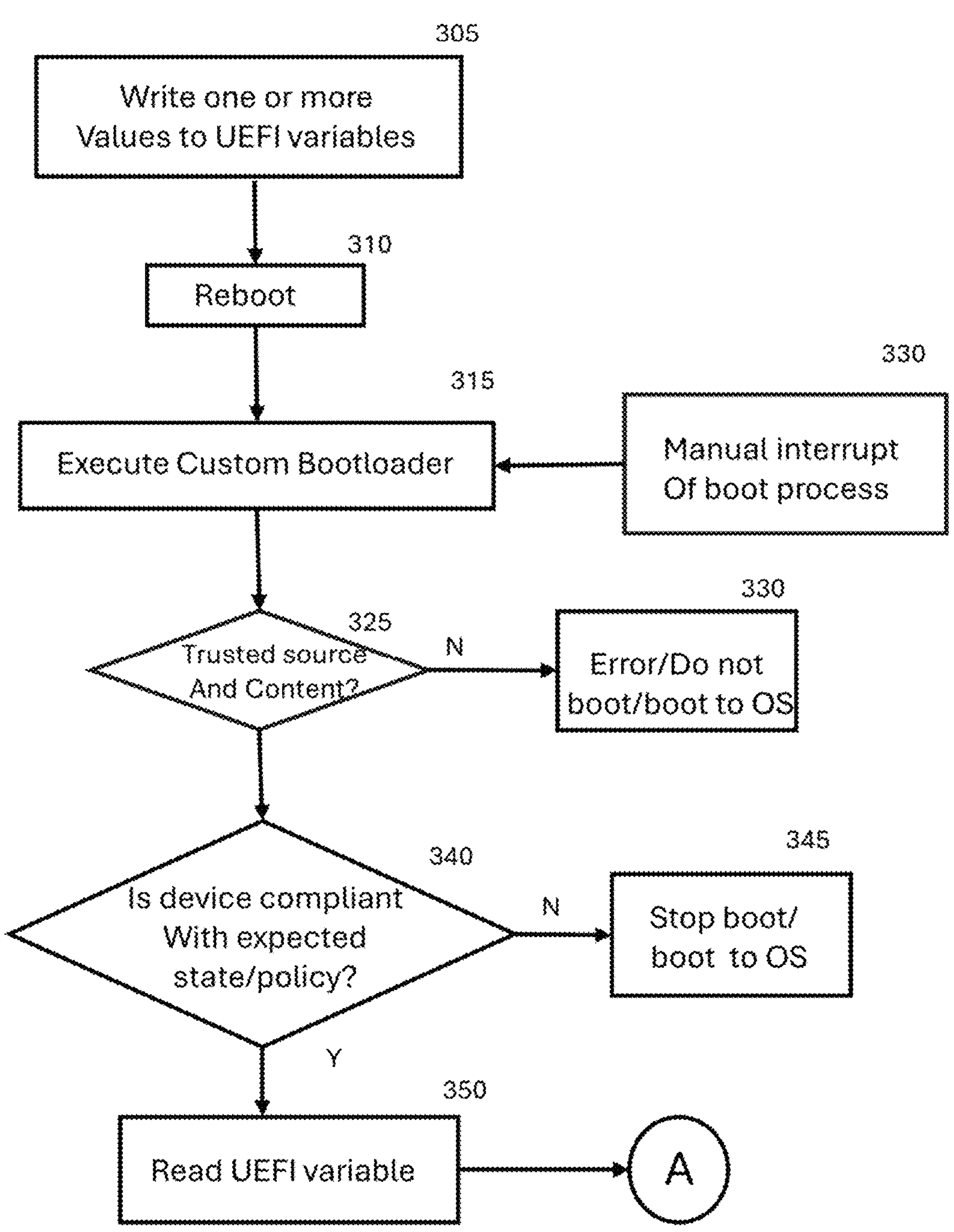
FIGS. 3A and 3B illustrates an exemplary boot process according to embodiments.
Figure 3B:
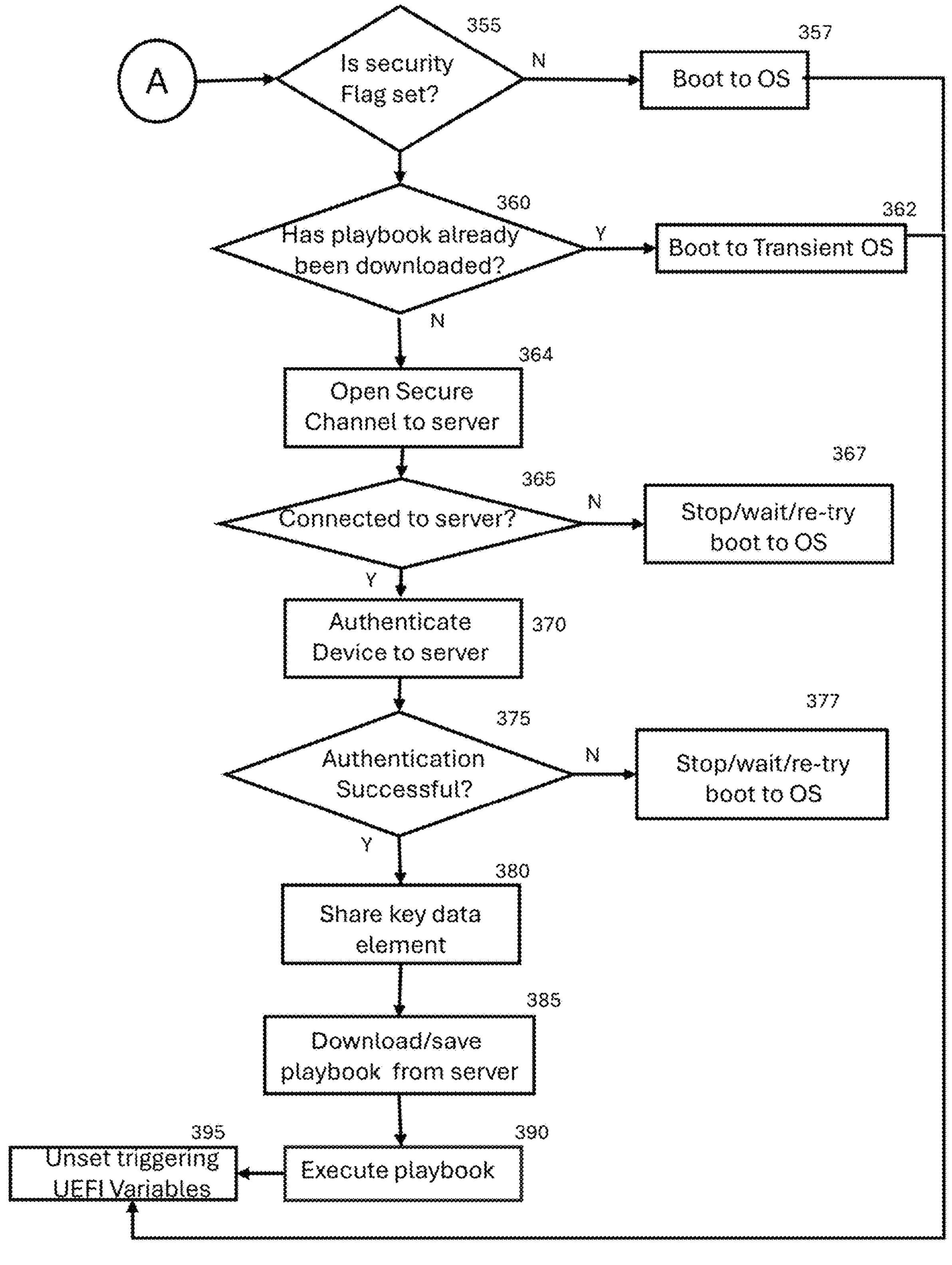

An exemplary boot process of the custom bootloader is depicted in FIGS. 3A and 3B in order to determine whether the normal boot sequence or an alternate programmed boot sequence should be followed, according to some embodiments. It is to be understood that this exemplary process is merely illustrative of the embodiments and should not be construed as in any way limiting the embodiments to a specific process. For instance, the process can begin at 305 with writing a signal including one or more values in a UEFI variable, preferably a signed UEFI variable, which triggers a reboot at 310. The signal may be in the form of a message in a specific, secure format and may originate from the OS agent, from a network connection or from another program or an API call invoked on the device itself.

The custom bootloader and/or the OS agent 114, which can be configured to receive secure messages, validate their crypto signage and process them, can be executed to begin a boot process at 315, after receiving and reading the signal to trigger an update of the one or more UEFI variables and initiate a reboot. Alternatively, the boot process can be manually interrupted, e.g., by a user pressing a designated key, such as a function key, at 330. In such cases, the described process can continue even if a UEFI variable is not set. In non-limiting embodiments, such a interruptions may be secured by a passcode, where the passcode is entered to have the bootloader execute playbooks and/or alternate code. In some scenarios, the passcode may be needed so that a desired playbook can be executed. This, in turn, allows the client device to return to an operational computing state based on a successful boot operation. As such, embodiments can be configured so that passcodes can be transmitted through one or more data communication channels between the client device and, for example, an intermediate computing device (e.g., a mobile phone, laptop, etc.). By way of non-limiting example, the data communication channel may be a Bluetooth connection, a WiFi connection, a cellular connection, and the like. By way of non-limiting example, the receipt of the passcode by the client device may be indicated in the form of a text or video message, electronic mail, a voice call, an audible alert, or the like. In some scenarios, a QR code (or a similar form of encrypted message) may be used.

In other embodiments, the interruptions may use other hardware coupled to the client device, such as one or more cameras to perform interruptions. For instance, a camera can be configured to use facial recognition technology, gesture-recognition technology, etc., to perform similar boot sequence interruptions. In some scenarios, client device and custom bootloader are configured to process encoded images, such as QR codes, to perform the functionality described herein.

To ensure that the signal originates from a trusted source, the custom bootloader and/or OS agent at 325 can use signing and cryptographic tests to ensure that the sender of the signal and content of the message can be trusted. If these tests are failed, e.g., a decision was made not set or persist the UEFI secure flag or a playbook did not pass validation by failing cryptographic signing of the payload from the server, an error message can be sent and/or the failed attempt can be written in a log at 330. Moreover, by way of non-limiting example, in this failed instance, the client device may automatically be locked/frozen after a configurable number of times where the device receives incorrectly signed payloads, thereby preventing the receipt of compromised payloads. In a further non-limiting example, the custom bootloader can be configured with predefined policy that can include, but is not limited to, proceeding with a launch of the primary OS, locking, rebooting, shutting down, etc.

During the boot process, if the custom bootloader determines the one or more UEFI variables have been set or the boot process has been manually interrupted, the custom bootloader is configured to determine at 340 whether the client device is compliant with expected state/policy configuration by checking certain local variables, e.g., network access, last used date, other data elements to be defined as part of a device policy, etc. It is also contemplated that, in addition to the local variables, the bootloader at 340 may, by non-limiting example, also read or write UEFI variables and/or EFI files. By way of non-limiting example, an authenticated UEFI variable which has been encrypted or signed with a unique identifier calculated based on reading values generated by the TPM function on the client device, e.g., in a portion of memory accessible to the custom bootloader, can be used to detect the custom bootloader's state, to prevent tampering and unauthorized code alterations or injections and to validate the integrity of the bootloader/partition/executables/UEFI variables. Further, if any tampering is discovered with, e.g., the UEFI variables, the client device may be deemed out of compliance. If determined out of compliance, the boot process can, e.g., be stopped at 345 until the client device can be placed back into compliance or can boot to the primary OS. Moreover, the custom bootloader can be configured to lock the client device or put the device into a frozen configuration that can only be rebooted/unlocked using a passcode or other unlock provider.

If the client device is deemed compliant, the custom bootloader is configured at 350 to read the one or more UEFI variables and, if it is determined from the one or more UEFI variables at 355 that a security flag is not set, the custom bootloader can boot to the primary OS at 357. In the event it is determined at 355 that a security flag is set, the custom bootloader can begin a programmable boot loader sequence at 360 to determine whether to execute a particular playbook to resolve the issue identified by the UEFI variable has already been downloaded and resides on the client device. The playbook can include a bootable image and/or a set of instructions/parameters for executing the bootable image. If the playbook has already been downloaded and stored on the client device, the custom bootloader can be configured to confirm the integrity of the playbook is preserved by checking its cryptographic signature, thereby ensuring that malicious instructions were not included as part of a playbook. Bootable images, which can be, by way of non-limiting example, of the type supported by ISO, IMG, and/or EFI applications, can be stored on the client device, e.g., on the bootable storage device or in volatile RAM storage as a RAM disk. Moreover, the instruction/parameters for executing the bootable image, if applicable, can be stored a one or more UEFI variable(s) or as files on the EFI partition.

If the playbook is already stored on the client device, the custom bootloader can execute the bootable image at 362 e.g., to boot to a transient OS, to complete the boot process. If the playbook to resolve the issue identified by UEFI variables is not found on the device, the custom bootloader can be configured to connect to the server to find instructions for next steps to take in the boot process. To connect to the server, a secure and authenticated channel to the server can be created or established by the custom bootloader at 364. By way of non-limiting example, this secure and authenticated channel can be established at a pre-OS level, such as at a firmware level below the OS level, by a firmware network connection, but it is also understood that the client device can create a secure connection to the server via a wired or wireless network connection, including cellular, Bluetooth, or any other network connection. The secure firmware network connection can be established by initializing device drivers for the relevant chip and interfacing with them to establish a secure channel to the server. Moreover, if the client device authentication occurs at the OS level, the secure network connection to the server can be achieved through other networking protocols known to those in the art.

The custom bootloader can next determine whether it is connected to the server at 365 to obtain further instructions from the server for continuing the boot process. If a connection is not successful, the custom bootloader will wait at 367 until the server is connected. However, by way of non-limiting example, a timer or similar device can be used so that, after a predetermined amount of time, the custom bootloader can increment a flag, (e.g., a flag storing the number of attempts to connect), and reboot. In the event the reboot again gets hung up at 367, it may be determined that there is some problem with the connection. To address such a problem, it may be advantageous, by way of non-limiting example, for the custom bootloader to be configured in a manner that enables the client device to create different network connections or, after a certain number of failures, boot to a primary OS, lock the client device, etc. By way of non-limiting example, until successfully communicating with the server, the bootloader can provide the device with a screen that describes the current activities, but does not allow the user of the client device to perform any actions.

In one scenario, upon connecting with the server, the client device at 370 can authenticate itself to the server by forwarding a cryptographic secure key or device token to identify itself to the server. As noted above, the cryptographic secure key or device token can be stored in one or more authenticated UEFI variables that are accessible only by the device. If authentication is unsuccessful, the boot process can be stopped at 377. However, to avoid remaining in a stalled process, by way of non-limiting example, a timer or similar device can be used so that, after a predetermined amount of time, the custom bootloader can increment a flag and reboot. In the event the reboot again gets hung up at 367, it may be determined by the custom bootloader that there may be some problem with the connection and it may then proceed to remedy the connection issues using the procedures described above. When the client device is successfully authenticated to the server at 375, the client device can share key data elements about its current state, including the value of the one or more UEFI variables to the server, at 380. The server can use these key data elements as inputs to generate a desirable playbook for remedying issues with the client device and then communicate or initiate a download and/or transmit the desired playbook/boot sequence to the client device at 385. The desired playbook, i.e., the desired bootable image and any parameters/instructions for executing the correct bootable image, can then be stored on the client device. As the playbook is received via secure connection from the server, the custom bootloader can store authorized boot images on the client device. Moreover, the custom bootloader can be configured to confirm that the integrity of the playbook is preserved by checking its cryptographic signature, thereby ensuring that foreign or unauthorized code was not maliciously inserted as some portion of a playbook.

When the client device has stored the desired playbook, the custom bootloader will execute the playbook at 390 which in turn completes the boot process in the manner specified by the boot image and/or instruction set included in the playbook. In executing the playbook, if the custom bootloader enables a bootable image to process input parameters in order to properly execute the desired functions, it can read these from the one or more UEFI variables in the UEFI/EFI file by a function that can run inside the playbook storage to validate that the values are still valid/signed. In this fashion, the custom bootloader can enable these values to become available for use by other applications using programmatic APIs or scripting languages such as, e.g., POWERSHELL or other mechanisms by which previously written values can be pulled into the playbook. The playbook, by non-limiting example, can also be configured to enable one or more UEFI variables and log files to be written and/or one or more server connections to be performed in order to provide execution status/log information.

After successful completion of the playbook, the custom bootloader can be instructed, via the playbook, to unset the one or more UEFI variables that triggered the reboot at 395 or set other values to cause the client device to enter into a "different" playbook on the next reboot. In the event the playbook did not unset the one or more UEFI variables, upon the next reboot of the client device, the custom bootloader will recognize the previous successful completion of the playbook and unset the one or more UEFI variables before executing at 315 to again determine from the one or more UEFI variables what the desired playbook should be in order to boot to the bootable image.

In the event that one or more UEFI variables have been set that indicate a different boot sequence should be pursued, the device will reboot and run the bootloader. The key data elements shared with the server at 380 will include error information to the server, and the server will respond with a signed boot script that includes boot image location and a command line. While the reboot may generally occur almost immediately, in non-limiting embodiments, the reboot can occur after a delay to happen at or after a certain time or a reboot may not be triggered as part of a provisioning playbook.

Figure 4A:
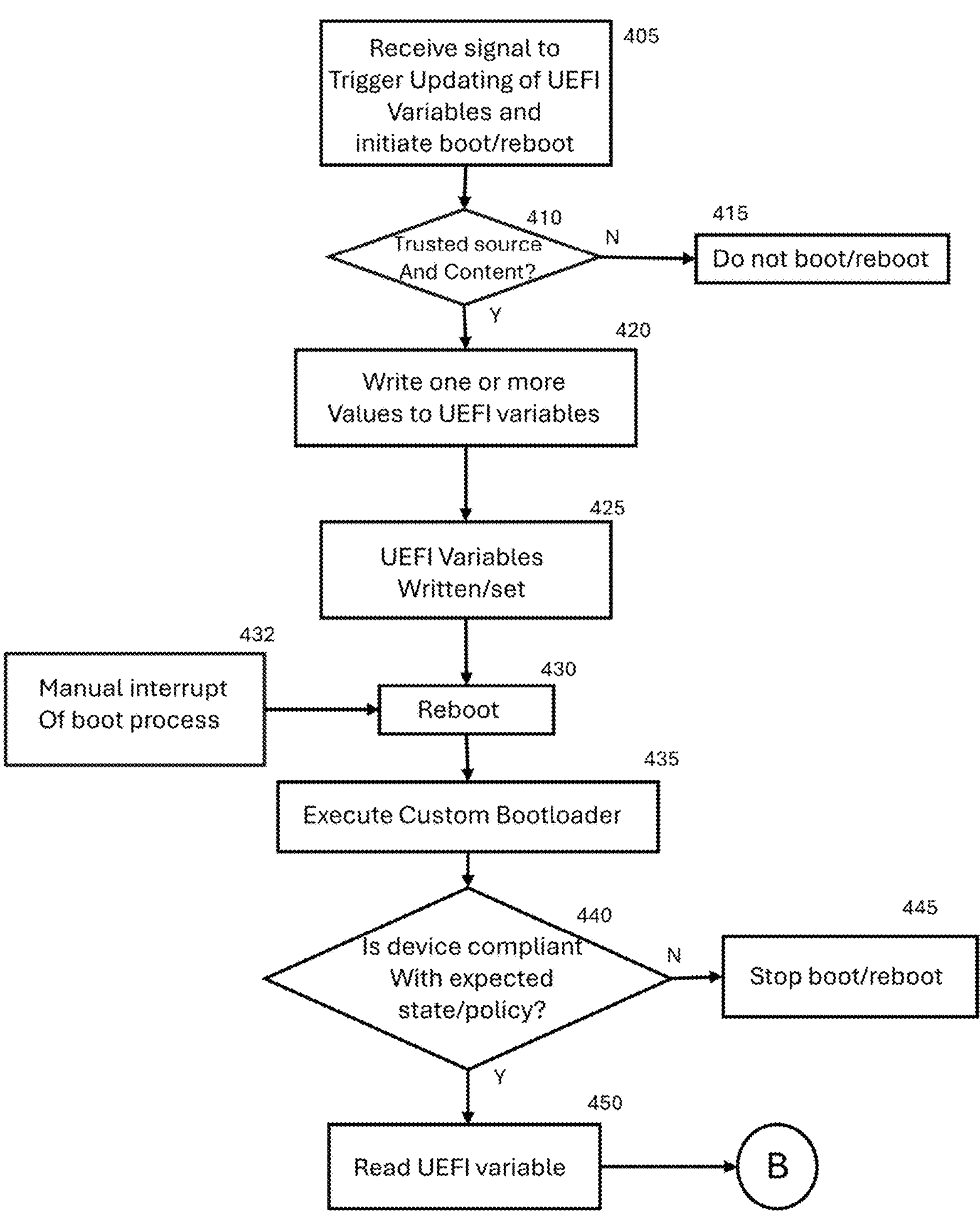
FIGS. 4A and 4B illustrate another exemplary boot process according to embodiments.
Figure 4B:
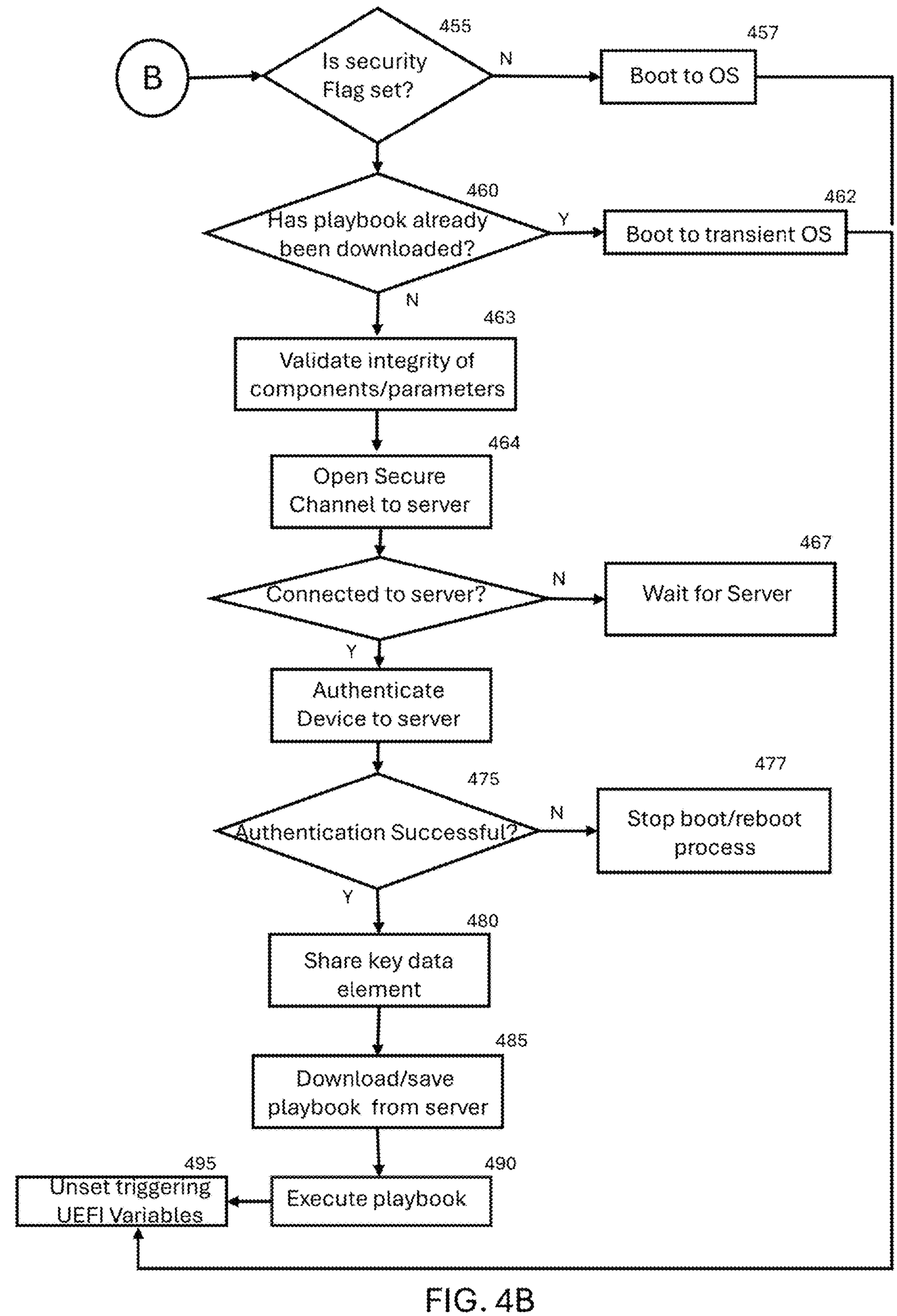

Another exemplary boot process of the custom bootloader is depicted in FIGS. 4A and 4B in order to determine whether the normal boot sequence or an alternate programmed boot sequence should be followed. It is to be understood that this exemplary process is merely illustrative of the embodiments and should not be construed as in any way limiting the embodiments to a specific process. The custom bootloader can be activated by a signal received in the device at 405 to trigger an update of the one or more UEFI variables and initiate a reboot. The signal may be in the form of a message in a specific, secure format from a network connection or may have originated from another program or an API call invoked on the client device itself.

To ensure that the signal originates from a trusted source, the client device at 410 can use signing and cryptographic tests to ensure that the sender of the signal and content of the message can be trusted. If these tests are failed, e.g., a decision not to persist UEFI is made or a playbook did not pass validation by failing cryptographic signing of the payload from the server, an error message may be sent and/or the failed attempt is written in a log at 415. Moreover, by way of non-limiting example, in a failed instance, the client device may automatically be locked/frozen after a configurable number of times where the client device receives incorrectly signed payloads, thereby preventing bad payloads (e.g., foreign payloads, malicious payloads, corrupted payloads, etc.). In a further non-limiting example, the custom bootloader can be configured with predefined policy that can include, but is not limited to, continuing to the OS, locking, rebooting, shutting down, etc. If these tests are passed, the custom bootloader can be configured with predefined policy that includes, but is not limited to, reading the one or more values of the set UEFI variable, which is preferably in a secure messaging format at 420. On writing/setting the one or more UEFI variables at 425, a reboot is initiated at 430, which can cause the bootloader process to be initiated, as the custom bootloader has been set as the active bootloader for the client device, replacing replaced the standard bootloader for the OS.

Even absent the signal to boot or setting of one or more UEFI variables, in embodiments, the boot process can be manually interrupted using the techniques previously described with reference to FIG. 3B.

If during the boot process, if it is found that the one or more UEFI variable is set or the boot process has been manually interrupted, the custom bootloader can be triggered or executed at 435 and may determine at 440 whether the client device is compliant with expected state/policy configuration by checking certain local variables, e.g., network access, last used date, other data elements to be defined as part of a device policy, etc. It is also contemplated that, in addition to the local variables, the bootloader at 440 may, by non-limiting example, also check UEFI variables and/or EFI files. By way of non-limiting example, an authenticated UEFI variable, which has been encoded or signed with a unique identifier calculated based on reading values generated by the TPM function on the device and stored, e.g., in a portion of memory accessible to the bootloader application, can be used to detect the bootloader's state, to prevent tampering and unauthorized code alterations or injections and to validate the integrity of the bootloader/partition/executables/UEFI variables. Further, if any tampering is discovered with, e.g., the bootloader, the one or more UEFI variables or the downloaded playbook, the client device may be deemed out of compliance. If determined out of compliance, the boot process can, e.g., be stopped at 445 until the device can be placed back into compliance or can boot to the primary OS. Moreover, the bootloader can be configured to lock the client device can be locked or put the device into a frozen configuration that can only be rebooted/unlocked using a passcode or other unlock provider.

If the client device is deemed compliant, the client device at 450 may read the UEFI variable(s) and, if it is determined from the UEFI variable(s) at 455 that a security flag is not set, the custom bootloader can boot to the primary OS at

457. In the event it is determined at 455 that a security flag is set, the custom bootloader may begin a programmable boot loader sequence at 460 to determine whether a playbook to resolve the issue identified by the one or more UEFI variables has already been downloaded and is resident on the client device. The boot playbook includes a bootable image and may also include a series of instructions/parameters for executing the bootable image. If the playbook has been downloaded, the bootloader can be configured to confirm at 463 that the integrity of the playbook is preserved by checking its cryptographic signature.

If the integrity of the playbook stored on the client device is confirmed, the custom bootloader may be executed the bootable image at 462 e.g., to boot to a transient OS, to complete the boot process. If the playbook to resolve the issue identified by one or more UEFI variables is not found on the client device, the custom bootloader the custom bootloader can be configured to connect to the server to find instructions for next steps to take in the boot process. However, before connecting to the server, the integrity of client device components/parameter, such, by way of non-limiting example, the bootloader/partition/executables/UEFI variables can be validated at 463. By way of non-limiting example, cryptographic information pulled from UEFI authenticated variables which have been encoded or signed with a unique identifier calculated based on reading values generated by the TPM function that are stored on the client device, e.g., in a portion of memory accessible to the bootloader application, can be used validate device components/parameters.

After the client device is authenticated, a secure and authenticated channel to the server can be created or established at 464. By way of non-limiting example, this secure and authenticated channel can be established at a firmware level, i.e., below an OS level, by a firmware network connection, but it is also understood that the client device can create a secure connection to the server via a wired or wireless network connection, cellular, Bluetooth or any other network connection. The secure firmware network connection can be established by initializing device drivers for the relevant chip and interfacing with them to establish a secure channel to the server. Moreover, if the device authentication occurs instead at the OS level, the secure network connection to the server can be achieved through other networking protocols known to those in the art.

The custom bootloader can next determine whether it is connected to the server at 465 to obtain further instructions from the server for continuing the booting process. If a connection is not successful, the custom bootloader can wait at 467 until the server is connected. However, by way of non-limiting example, a timer or similar device can be used so that, after a predetermined amount of time, the bootloader can increment a flag and reboot. In the event the reboot again gets hung up at 467, this may be an indication that there may be some problem with the connection and it may then proceed to remedy the connection issues using the procedures described above. By way of non-limiting example, until successfully communicating with the server, the bootloader can provide the device with a display or graphical user interface (GUI) that describes the current activities but does not allow the user of the device to perform any actions.

In embodiments, upon connecting with the server, the device at 470 can authenticate itself to the server by forwarding a cryptographic secure key or device token to identify itself to the server. As noted above, the cryptographic secure key or device token can be stored in an authenticated UEFI variable that is accessible only by the device. If authentication is unsuccessful, the boot process can be stopped at 477. However, as discussed above, to avoid remaining in a stalled process, by way of non-limiting example, a timer or similar device can be used so that, after a predetermined amount of time, the bootloader can increment a flag and reboot. In the event the reboot again gets hung up at 477, this may be an indication that there may be some problem with the connection and it may then proceed to remedy the connection issues using the procedures described above.

When the device is successfully authenticated to the server at 475, the device can share key data elements about its current state, including the value of the one or more UEFI variables, at 480. The server can use these key data elements to derive the correct playbook for the device and then communicate or initiate a download and/or transmit the correct playbook/boot sequence to the device at 485. The playbook downloaded/received from the server, i.e., the correct bootable image and any parameters/instructions for executing the correct bootable image, can be stored on the client device. As the boot images/playbooks are received via secure connection from the server, the custom bootloader and/or OS agent will only store authorized playbooks/boot images on the client. Moreover, the bootloader and/or OS agent can be configured to confirm that the integrity of the playbook is preserved.

When the device has stored the correct playbook/boot sequence, the bootloader will execute the playbook at 490, which may include booting to the correct bootable image at 462, e.g., to boot to a transient OS, to complete the boot process. In executing the playbook, if the bootable image needs to process input parameters in order to properly execute the desired functions, it can read these from the one or more UEFI variables in the UEFI/EFI file by a function that can run inside the playbook storage to validate that the values are still valid/signed. After this, the function can make the values available for consumption inside the playbook using programmatic APIs or scripting languages such as, e.g., POWERSHELL or other mechanisms by which previously written values can be pulled into the playbook. By non-limiting example, the playbook can also write one or more UEFI variables and log files and/or connect to a server to provide execution status/log information.

After successful completion of the playbook, the bootloader can be instructed, via the playbook, to unset the one or more UEFI variables that triggered the reboot at 495 or the playbook can set other values to cause the device to enter into a "different" playbook on the next reboot. In the event the playbook did not unset the one or more UEFI variables, upon the next reboot of the device, the custom bootloader will recognize the previous successful completion of the playbook and unset the one or more UEFI variables before executing a reboot at 430 to again determine from the one or more UEFI variables what the desired playbook should be in order to boot to the bootable image.

In the event that one or more UEFI variables have been set that indicate a different boot order should be pursued, the client device can be rebooted to run the bootloader. The key data elements shared with the server at 480 will include error information to the server, and the server will respond with a signed boot script that includes boot image location and a command line. Further, in embodiments, data can also be shared with the server at 490 and/or after 490 in terms of providing a status back to the server during execution and after execution of the playbook. In this way, a console user (or API program) can get a status back.

Figure 5:
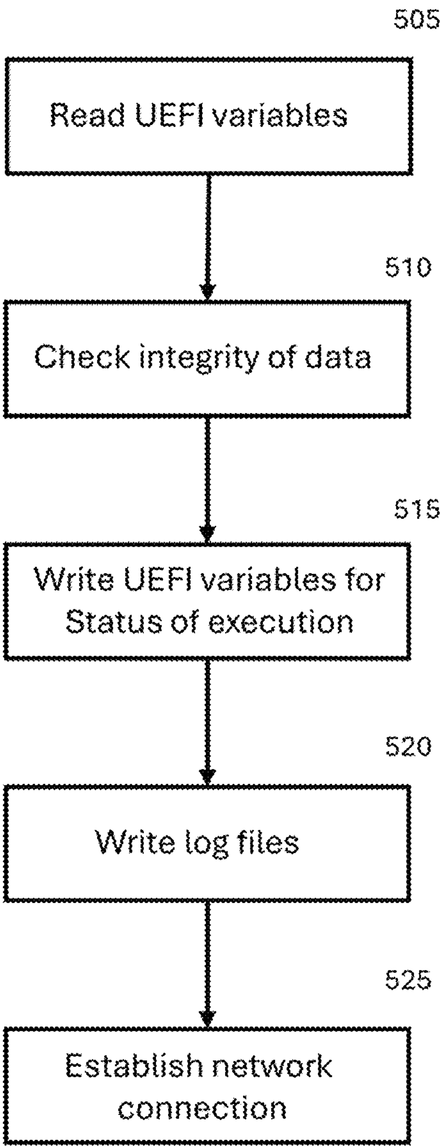
FIG. 5 illustrates an exemplary playbook execution process according to embodiments.

FIG. 5 shows an exemplary flow for executing a playbook according to non-limiting embodiments, e.g., at 315 (in FIG. 3A) or at 435 (in FIG. 4A), in which one or more UEFI variables representing the actions to be performed/parameters to be used are read at 505 and the integrity of the data is checked at 510 As the playbook is executed, one or more UEFI variables representing the status of the execution are written at 515. Log files are written at 520 which can assist in auditability of actions and in troubleshooting. Further, a network connection to external systems can be established at 525 as part of running a playbook, which can result in further downloads to the device, e.g., for "install file" or "re-install OS" capabilities.

Moreover, based on the evaluation of the UEFI variables on the server, the boot process executed by the custom bootloader can resolve a number of issues based upon the UEFI variable(s) or manual interruption by the user. By way of non-limiting example, the playbook transmitted by the server can:

- instruct the client to launch a backup recovery service and restore the device to a state from an earlier backup. This playbook can launch a bare-metal recovery tool, and consume certain parameters from the device, such as backup date, encryption key, and the like;
- download and boot into a separate operating system, e.g., a secondary or transient OS, to perform targeted repairs to a primary OS platform. This could include, but is not limited to, mounting a disk volume and adding/removing files from a system affected by malware or rendered unstable by an error. Moreover, embodiments can also include changing registry keys, or downloading and running certain tools to establish the health of the device and/or re-imaging a device with a new OS;
- download and run a utility to perform a file-based disk wipe on the primary disk partition. Also, embodiments allow for a remote invocation of disk wiping tools that bypass system files on the disk locked by the operating system; remote control of display/windows/mouse for support purposes. The booted playbook may provide remote control of a device, allowing a remote support person to manage the screen/keyboard/mouse of the device. Embodiments described herein also enable the provisioning of new devices remotely. In one embodiment, this can include zero-touch onboarding of new devices, adding a device to a corporate domain without needing to set up a local or remote network administrator account;
- execute a custom script to perform a custom action; and/or
- retrieval of forensic information for secondary analysis or off-line processing, From the foregoing, it is understood that embodiments are directed to using a playbook to resolve issues on the device, which will vary based on the issue to be corrected. In executing the embodiments, once a correct or desired playbook is identified/selected to resolve the issue identified by the one or more UEFI variables, the parameters for the playbook, which have been transmitted to the device over the secure messaging channel and stored as one or more UEFI variables or files as described above, can be retrieved from this storage, decrypted and validated as necessary and used in the execution of the bootable image in order to resolve the issue. This retrieval/decryption/consumption of the playbook parameters can be performed by executable code in the bootable image. While the communication of the playbook from a remote server to a device can be uniformly executed irrespective of computing environment (e.g., MacOS, Windows, Linux, and the like), the actual parameters provided in the playbook will vary based on the action to be taken. By way of non-limiting example, the parameters to be captured to perform, e.g., a disk-wipe would be different from the parameters to be captured to perform, e.g., a registry repair, but once captured, those appropriate parameters are included in the playbook to resolve the issue.

In some embodiments, instead of waiting for a predetermined number of boot failures or being triggered by identified the one or more UEFI variables or a manual interrupt of the boot process, the bootloader described herein, as part of every boot process of the device, can connect with the server through a secure channel, e.g., via a firmware network at the firmware level or via a network at the OS level, to obtain the appropriate playbook or to obtain instructions needed for completing the boot process.

In other embodiments, when provisioning the bootloader on the device, a secondary or transient OS can also be loaded onto the device. Moreover, when the secondary or transient OS is required, e.g., for performing the targeted repairs to the primary OS platform or for reimaging the device with a new OS, the credentials of the primary OS can be shared with or picked up by the secondary or transient OS so that connection to the server via the same protocols as used with the primary OS are available.

Aspects of embodiments of the present disclosure can be implemented by such special purpose hardware-based systems that perform the specified functions or acts, or combinations of special purpose hardware and computer instructions and/or software, as described above. In embodiments, the software elements can include firmware, resident software, microcode, etc.

As will be appreciated by those ordinarily skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure, such as the custom bootloader and/or the boot process via the custom bootloader, may take the form of a computer program product embodied in any tangible medium of expression having computer-usable program code embodied in the medium.

Any combination of one or more computer usable or computer readable medium(s) may be utilized in the server and in the client. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a bootable storage device, including a solid state drive or hard disk drive, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a USB key, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the client computer, partly on the client computer, as a stand-alone software package, partly on the client or client device and partly on the server, whether on premises or in the cloud. The client or client device may be connected to a destination server or service through a VPN or any other type of network. This may include, for example, firmware level networking, a local area network (LAN) or a wide area network (WAN), cellular and LoT networks, or the connection may be made to an external computer (for example, through the Internet using an Internet Service Provider). Additionally, in embodiments, the present invention may be embodied in a field programmable gate array (FPGA).

The client device, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device.

The client device may include at least one processor, such as, for example, a central processing unit, a graphics processing unit, or both. Moreover, the client device may also include a computer memory, which may include a static memory, a dynamic memory, or both, and may additionally or alternatively include a bootable storage device, including a solid state drive or a hard disk drive, random access memory, a cache, or any combination thereof. Of course, those skilled in the art appreciate that the computer memory may comprise any combination of known memories or a single storage.

The client device may also include a medium reader and a network interface. Furthermore, the client device may include any additional devices, components, parts, peripherals, hardware, software or any combination thereof which are commonly known and understood as being included with or within a computer system, such as, but not limited to, an output device. The output device may be, but is not limited to, a speaker, an audio out, a video out, a remote control output, or any combination thereof. Further, a bus can be provided for communication between the various components of a computer system.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present disclosure, those of ordinary skill can devise variations of the present disclosure without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

What is claimed:

1. A method of booting/rebooting a client device in a client/server network, the method comprising:

detecting an unsuccessful boot of the client device, wherein the unsuccessful boot comprises the client device being unable to enter a subsequent phase of a boot process after an initial phase of the boot process; and responsive to the detection of the unsuccessful boot, issuing one or more computer-implemented instructions superseding one or more computer-implemented instructions issued by a standard bootloader installed on the client device, wherein the one more or more computer-implemented instructions superseding the one or more computer-implemented instructions issued by the standard bootloader comprise:

establishing a connection to a server over a computer network to communicate one or more bootup conditions of the client device;

receiving, from the server over the computer network, a desired playbook comprising a set of instructions configured to cause the client device to enter the subsequent phase of the boot process, the desired playbook being based on the one or more boot conditions communicated to the server from the client device and from previous playbooks prepared by the server to address similar boot conditions on one or more different client devices in the client/server network having a same computing environment profile to produce a remedied computing environment profile; and executing the desired playbook to adjust one or more properties of a computing environment profile of the client device to conform to the remedied computing environment profile and cause the client device to transform from an inoperable computing state to an operational computing state by entering the subsequent phase of the boot process.

2. The method of booting/rebooting the client device according to claim 1, wherein the unsuccessful boot comprises unsuccessfully launching an operating system resident on the client device to cause the client device to transition into the operational computing state.

3. The method of booting/rebooting the client device according to claim 1, wherein the desired playbook is configured for use by a plurality of different client devices having the same computing environment profile.

4. The method of booting/rebooting the client device according to claim 1, wherein the desired playbook comprises a bootable image configured to remediate the unsuccessful boot.

5. The method of booting/rebooting the client device according to claim 1, wherein, when executed, the desired playbook causes the client device to at least one of:

reinstall an operating system (OS);

restore the client device to a state from an earlier backup;

remove selected files, change registry settings and reboot;
download and boot into an alternate operating system to repair the OS;
add or update files to the OS;
change settings of the client device both at a BIOS and an OS level;
install or remove programs;
run third-party applications;
install or update the OS;
collect usage data or logs from the client device and send to the server;
install, update or remove user profiles from the client device;
enroll the client device in databases or directories as part of onboarding a new client device;
perform offboarding activities comprising at least one of unregistering the client device or backing up user data before deleting from the client device;
execute a custom script to perform a custom action; or
retrieval of forensic information.

6. The method of booting/rebooting the client device according to claim 1, wherein the desired playbook configured to remediate a cause of the unsuccessful boot received from the server is received via Bluetooth.

7. The method according to claim 1, wherein a bootloader installed on the client device is configured to detect the unsuccessful boot of the client device and to issue the one or more instructions superseding the one or more instructions issued by the standard bootloader.

8. The method according to claim 1, wherein the one or more bootup conditions of the client device identify corruption or tampering of an operating system.

9. A client device in a client/server network, comprising:
a processor; and
one or more storage devices on which an operating system configured to cause the client device to transition into an operational computing state is stored, the one or more storage devices further storing a custom bootloader with a set of computer readable instructions executable by the processor, a standard bootloader of the operating system, wherein the custom bootloader is configured to issue one or more instructions that supersede one or more instructions issued by the standard bootloader,
wherein, when executed by the processor, the set of computer readable instructions of the custom bootloader cause the processor to:
detect an unsuccessful boot of the operating system on the client device, in which the unsuccessful boot comprises the client device being unable to enter a subsequent phase of a boot process after an initial phase of the boot process;
connect to a server on the client/server network;
obtain a desirable playbook comprising a set of instructions from the server that are configured to remediate an inability of the client device to enter the subsequent phase of the boot process; and
execute the desirable playbook on the client to cause the client device to enter the subsequent phase of the boot process, thereby transforming the client device from an inoperable state to an operational state.

10. The client device according to claim 9, wherein the desirable playbook comprises a set of remediation instructions that, when executed by the processor, cause the processor to remediate a cause of the unsuccessful boot of the operating system.

11. The client device according to claim 9, wherein, after connecting to the server, data related to the unsuccessful boot is transmitted to the server for evaluation and for generating the desirable playbook to be executed on the client device.

12. The client device according to claim 9, wherein the desirable playbook to be executed on the client device is generated on the server from evaluating data forwarded from the client device related to the unsuccessful boot with data from a plurality of different client devices within the client/server network related to respective unsuccessful boots.

13. The client device according to claim 12, wherein the data from the plurality of different client devices related to the respective unsuccessful boots is classified according to causes of the respective unsuccessful boots and the data from the client device related to the unsuccessful boot is evaluated with the data classified according to the causes of the respective unsuccessful boots having causes similar to the cause of the unsuccessful boot.

14. The client device according to claim 13, wherein, based on the the plurality of different client devices related to the respective unsuccessful boots classified according to the causes of respective unsuccessful boots evaluated with the data classified according to the causes of the respective unsuccessful boots having causes with a similar to the cause of the unsuccessful boot, the server generates different playbooks to remediate respective causes for the respective unsuccessful boots.

15. The client device according to claim 9, wherein the desirable playbook comprises a bootable image, which, when executed by the processor, cause the processor to remediate a cause of the unsuccessful boot of the operating system.

16. The client device according to claim 15, wherein the desirable playbook further comprises a set of remediation instructions that, when executed by the processor, cause the bootable image executed by the processor to remediate the cause of the unsuccessful boot of the operating system.

17. The client device according to claim 9, wherein, when executed, the desirable playbook causes the processor to at least one of:
reinstall the operating system;
restore the client device to a state from an earlier backup;
remove selected files, change registry settings and reboot;
download and boot into an alternate operating system to repair the operating system;
add or update files to the operating system;
change settings of the client device both at a BIOS and an operating system level;
install or remove programs;
run third-party applications;
install or update the OS;
collect usage data or logs from the client device and send to the server;
install, update or remove user profiles from the client device;
enroll the client device in databases or directories as part of onboarding a new client device;
perform offboarding activities comprising at least one of unregistering the client device or backing up user data before deleting from the client device;
execute a custom script to perform a custom action; or
retrieval of forensic information.

18. The client device according to claim 9, wherein the client device connects to the server on the client/server network via Bluetooth.

19. The method of booting/rebooting the client device according to claim 1, wherein the one or more computer-implemented instructions superseding the one or more computer-implemented instructions issued by the standard bootloader are executed from a hard disk drive or a solid state drive resident on the client device.

20. A client device in a client/server network, comprising:

a processor; and one or more storage devices on which an operating system configured to cause the client device to transition into an operational computing state is stored, the one or more storage devices further storing a set of computer readable instructions executable by the processor, and a standard bootloader of the operating system, wherein, when executed by the processor, the set of computer readable instructions cause the processor to:

detect an unsuccessful boot of the operating system on the client device, in which the unsuccessful boot comprises the client device being unable to enter a subsequent phase of a boot process after an initial phase of the boot process;

responsive to detecting the unsuccessful boot of the operating system, execute one or more instructions that supersede one or more instructions issued by the standard bootloader, when executed by the processor, the one or more instructions superseding the one or more instructions issued by the standard bootloader cause the processor to:

establish a connection over a computer network to a server on the client/server network and communicate one or more bootup conditions of the client device;

receive from the server over the computer network, a desirable playbook comprising a set of instructions configured to cause the client device to enter the subsequent phase of the boot process, the desirable playbook being based on the one or more boot conditions communicated to the server from the client device and from previous playbooks prepared by the server to address similar boot conditions on one or more different client devices in the client/server network having a same computing environment profile in order to produce a remedied computing environment profile; and execute the desirable playbook on the client device to adjust one or more properties of a computing environment profile of the client device to conform to the remedied computing environment profile and to cause the client device to enter the subsequent phase of the boot process, thereby transforming the client device from an inoperable state to an operational state.

21. The client device according to claim 20, wherein the one or more computer-implemented instructions superseding the one or more computer-implemented instructions issued by the standard bootloader are executed from a hard disk drive or a solid state drive resident on the client device.

22. The client device according to claim 20, wherein data from the one or more different client devices related to respective unsuccessful boots is classified according to causes of the respective unsuccessful boots and the data from the client device related to the unsuccessful boot is evaluated with the data classified according to the causes of the respective unsuccessful boots having causes similar to the cause of the unsuccessful boot.

23. The client device according to claim 22, wherein, based on the data from the one or more different client devices related to the respective unsuccessful boots classified according to the causes of the respective unsuccessful boots evaluated with the data classified according to the causes of the respective unsuccessful boots having causes with a similar to the cause of the unsuccessful boot, the server generates different playbooks to remediate respective causes for the respective unsuccessful boots.

24. The client device according to claim 20, wherein the desirable playbook comprises a bootable image, which, when executed by the processor, cause the processor to remediate the one or more boot conditions of the unsuccessful boot of the operating system on the client device.

25. The client device according to claim 24, wherein the desirable playbook further comprises a set of remediation instructions that, when executed by the processor, cause the bootable image executed by the processor to remediate the one or more boot conditions of the unsuccessful boot of the operating system on the client device.

26. The client device according to claim 20, wherein the one or more storage devices storing an alternate bootloader that includes a set of computer readable instructions comprising the one or more instructions that supersede one or more instructions issued by the standard bootloader.

* * * * *